(12) United States Patent
Arns

(10) Patent No.: US 9,308,953 B2
(45) Date of Patent: Apr. 12, 2016

(54) METHOD FOR THE PRODUCTION OF A HOT FORMED AND PRESS HARDENED MOTOR VEHICLE BODY STRUCTURE, AND MOTOR VEHICLE BODY STRUCTURE

(71) Applicant: Benteler Automobiltechnik GmbH, Paderborn (DE)

(72) Inventor: Wilhelm Arns, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 472 days.

(21) Appl. No.: 13/659,347

(22) Filed: Oct. 24, 2012

(65) Prior Publication Data

US 2013/0283616 A1 Oct. 31, 2013

(30) Foreign Application Priority Data

Oct. 27, 2011 (DE) .......................... 10 2011 054 865

(51) Int. Cl.
| | |
|---|---|
| *B62D 65/00* | (2006.01) |
| *B21D 53/88* | (2006.01) |
| *B21D 22/02* | (2006.01) |
| *C21D 1/673* | (2006.01) |

(52) U.S. Cl.
CPC .............. *B62D 65/00* (2013.01); *B21D 22/022* (2013.01); *B21D 53/88* (2013.01); *C21D 1/673* (2013.01); *C21D 2261/00* (2013.01); *Y10T 29/49622* (2015.01); *Y10T 29/49995* (2015.01)

(58) Field of Classification Search
CPC ...... B62D 65/00; B21D 22/022; B21D 53/88; C21D 1/673; C21D 2261/00; Y10T 29/49995; Y10T 29/49622
See application file for complete search history.

(56) References Cited

U.S. PATENT DOCUMENTS

| | | | | |
|---|---|---|---|---|
| 6,878,220 | B2 * | 4/2005 | Gehringhoff et al. | .......... 148/654 |
| 7,290,811 | B1 | 11/2007 | Arns | |
| 7,357,432 | B2 | 4/2008 | Arns | |
| 7,407,206 | B2 | 8/2008 | Arns | |
| 7,543,866 | B2 | 6/2009 | Arns | |
| 8,141,230 | B2 * | 3/2012 | Brodt et al. | ................... 29/527.2 |
| 8,261,591 | B2 * | 9/2012 | Hielscher | ......................... 72/350 |
| 2003/0066581 | A1 * | 4/2003 | Gehringhoff et al. | .......... 148/624 |
| 2007/0102955 | A1 * | 5/2007 | Bodin et al. | ................ 296/146.6 |
| 2010/0018277 | A1 * | 1/2010 | Hielscher | ......................... 72/352 |
| 2010/0269962 | A1 | 10/2010 | Im et al. | |

FOREIGN PATENT DOCUMENTS

| | | |
|---|---|---|
| DE | 10149221 | 8/2002 |
| DE | 102 54 695 | 4/2004 |
| DE | 10254695 B3 | 4/2004 |

* cited by examiner

*Primary Examiner* — Ryan J Walters
(74) *Attorney, Agent, or Firm* — Henry M. Feiereisen LLC

(57) ABSTRACT

In a method of making a motor vehicle body structure, at least one region of a sheet metal plate of hardenable steel sheet is pierced using a blanking and/or cutting process. The at least one region of the sheet metal plate is preformed into a preform which is then hot formed in a hot forming tool and press hardened.

20 Claims, 8 Drawing Sheets

METHOD FOR THE PRODUCTION OF A HOT FORMED AND PRESS HARDENED MOTOR VEHICLE BODY STRUCTURE, AND MOTOR VEHICLE BODY STRUCTURE

CROSS-REFERENCES TO RELATED APPLICATIONS

This application claims the priority of German Patent Application, Serial No. 10 2011 054 865.3, filed Oct. 27, 2011, pursuant to 35 U.S.C. 119(a)-(d), the content of which is incorporated herein by reference in its entirety as if fully set forth herein.

BACKGROUND OF THE INVENTION

The present invention relates to a method for the production of a hot formed and press hardened motor vehicle body structure, and to a motor vehicle body structure.

The following discussion of related art is provided to assist the reader in understanding the advantages of the invention, and is not to be construed as an admission that this related art is prior art to this invention.

It is generally known to increase strength of motor vehicle structural parts, such as body structures, by using high-strength steel or super high-strength steel. This significantly increases strength and torsional stiffness even though the wall thickness remains the same and the specific weight remains substantially the same. By using this type of material, it is also conceivable to reduce the wall thickness while still attaining at least same or slightly enhanced stiffness. As a result, the specific weight of the structure decreases in the absence of any loss in strength. As weight is saved or strength is increased, the total weight of the motor vehicle can be reduced which in turn results in lower fuel consumption and accompanying $CO_2$ emission.

Combined hot forming and press hardening has been used to produce high-strength steel or super high-strength steel. This process involves heating of a hardenable steel alloy which is then formed in the heated state and hardened through quenching. Heating is hereby executed to a temperature above austenitizing temperature or above Ac3 temperature of the respectively used steel. There are various possibilities to quench hot formed steels, with a combined hot forming and press hardening tool having been shown as especially effective. In such a tool, a flow of coolant is used to lower the temperature or to cool the hot-formed structure. Selecting cooling times and cooling rates permit adjustment of strength properties of the structure in a desired way. In addition, it is also possible to target certain regions of the structure in order to provide desired strength properties.

Body structures produced in this way require finishing or post-treatment operations, when the structure should be provided with openings, holes, feedthroughs or recesses. As press hardening results in high-strength or super high-strength properties, the provision of holes or openings becomes very difficult and machine tools used for this process are subject to high wear, causing an increase in production costs. To attain a high degree of precision in shape, it has been conventional wisdom that the formation of openings, feedthroughs, or holes in the structure prior to hot forming and press hardening should be avoided.

It would be desirable and advantageous to provide an improved method for the production of a hot formed and press hardened motor vehicle body structure to obviate prior art shortcomings.

SUMMARY OF THE INVENTION

According to one aspect of the present invention, a method of making a motor vehicle body structure includes perforating at least one region of a sheet metal plate of hardenable steel sheet by a blanking and/or cutting process, preforming the at least one region of the sheet metal plate into a preform, and hot forming the preform in a hot forming tool.

It has been surprisingly found that a motor vehicle body structure can be produced by using a preform that has previously been blanked and/or cut with a respective tool that is subject to less wear as the sheet metal plate is still soft. The region of the preform for the production of a hole and/or opening, in particular in the form of a through-passage, is highly malleable so that the material is exposed to less stress during the hot forming process as a result of the preceding preforming step. Any stress caused by preforming is reduced by the heat during the hot forming process. This affords also the possibility to form the preformed region into the final shape by using a movable tool within the hot forming tool or to calibrate it by using a positioning mandrel so that the remainder of the structure can be hot formed in an especially positionally precise manner.

Overall, the degree of deformation and the resultant stretching strain is reduced during the actual hot forming process. As a result of the two-stage forming process in the area of the opening or cutout, it becomes possible to shape the material in two stages so that, for example, the material is able to undergo a microstructural transformation during heating to a temperature above austenitizing temperature after the preforming step and possibly encountered micro cracks during preforming and/or cutting and/or blanking are tempered such that the hot formed and press hardened structure exhibits significantly less micro crack formation in the area of the through-passage compared to a hot formed and press hardened motor vehicle body structure produced conventionally.

According to another advantageous feature of the present invention, the preform can be configured as an inwardly directed collar to project beyond only one side of the sheet metal plate so that an opposite side thereof is planar. Advantageously, the collar can be inwardly turned. As a result, the sheet metal plate can be transported after the preforming step as the bearing surface opposite to the collar is substantially planar. The sheet metal plate can thus be moved during further production on a roller table without risk of entanglement of the projecting collar with the transport rollers. In particular a transport through a continuous furnace is rendered simple in order to heat the structure above the austenitizing temperature. The sheet metal plate has thus a flat underside as would be the case for a planar plate without preform and thus can easily be transported on a roller belt. This provides benefits for handling, thereby lowering costs for a respective production line. There is no need for turning using a manipulator or robot during transfer into the press tool or during transfer into a heating device.

According to another advantageous feature of the present invention, the preform can be shaped in the absence of an area projecting beyond a bearing surface of the sheet metal plate, and the sheet metal plate can be placed with the bearing surface upon a transport system for transfer to a further process step. The bearing surface is suitably an underside of the sheet metal plate. The preforming step according to the invention with a respectively following hot forming enables also to configure flange regions with through-passages towards the underside, without complicating transport or complicating the transport through turning operations.

According to another advantageous feature of the present invention, the preform may have a configuration which corresponds to the final shape so that the hot forming step results in a calibration of the preform to receive a precise end contour. A high positional precision during actual hot forming and press hardening operations can hereby be attained by using a calibration mandrel or positioning mandrel which is moved into the structure. The thus-produced hot formed and press hardened motor vehicle body structure has a high dimensional precision.

Furthermore, the preform may itself be used for positioning the sheet metal plate in the hot forming and press hardening tool. Calibration results in a compensation or reduction of unwanted tolerances or production-related geometrical fluctuations due to cold preforming.

According to another advantageous feature of the present invention, the preform can receive a final shape in the hot forming step. The preform is hereby further shaped during the hot forming step into the final shape. Thus, a two-stage forming process is provided that expands the shaping limits and/or leads to less crack formation in the marginal area of the preform. As a result, a structure is produced that has a significantly longer life compared to conventional structures.

According to another advantageous feature of the present invention, the blanking and/or cutting process may result in the formation of a hole defined by a hole rim which does not require a finishing process after undergoing hot forming and press hardening. The produced hole may hereby be configured as recess, opening or through-passage. In particular, when a cuffing operation is involved, the hole rim is free of burr formation and does not have to be refinished. In some instances involving particular requirements on the hole rim, for example a chamfered or rounded hole edge in order to allow a feed through of a cable without rubbing against the hole rim during operation of the motor vehicle, the hole rim may undergo a quenching and tempering process, e.g. through soft annealing. Thus, the hole rim may be heat treated for example to improve strength properties.

As an alternative, a machining process may be used to refinish the hole wall so that for example an edge of the hole rim is breached. As this operation is executed prior to the hot forming and press hardening process, the respectively used tools are less subject to wear and the hole rim is shaped in the following forming and press hardening process to its end contour. Refinishing and possible adverse impact on the hole rim is avoided after press hardening.

According to another advantageous feature of the present invention, cutting and/or refinishing may be carried out through punching as the sheet metal plate is cut to size. Advantageously, the cutting and/or refinishing may be implemented by beam cutting, such as laser beam cutting, water jet cutting, plasma beam cutting, or electron beam cutting. Already existing beam cutting facilities may be used in a production line so that additional investments for new tools can be kept to a minimum. This reduces production costs for producing a structure according to the present invention. A further benefit is also that beam cutting, e.g. laser beam cutting or plasma beam cutting or electron beam cutting, causes heat introduction that can be used during refinishing works directly for quenching and tempering of the hole rim to prevent crack formation in this region.

According to another advantageous feature of the present invention, the cutting process can be executed at an angle to provide the sheet metal plate with a cutting edge which extends at such an angle. Advantageously, the angle can range between 1 and 80 degrees, preferably between 10 and 60 degrees. Currently preferred is an angle in the range between 10 and 40 degrees. This allows realization of a hole rim with respective angle. In the event a through-passage is produced for feedthrough of a cable, this angle may be obtuse on the inner side of the hole rim so as to prevent rubbing and severing of cable routed through the through-passage. Advantageously, the preform is further shaped in the hot forming tool, with the actual hot forming operation commencing once the preform has been shaped. Advantageously, a mandrel, which is movable in relation to the hot forming tool, can be introduced into the preform to assume the subsequent forming of the preform. The forming process is then executed with the hot forming tool.

According to another advantageous feature of the present invention, the inwardly turned collar or the preform can be produced with a hole rim which extends at an angle in relation to a bearing surface of the sheet metal plate and is shaped by the hot forming step so as to extend in offset parallel relationship to the bearing surface at a distance thereto. As a result, the presence of a through-passage with a hole rim can be realized, with the hole rim extending substantially parallel to the surface area adjacent to the through-passage. The presence of an acute angle, i.e. an angle less than 90 degrees, is thus avoided at the produced through-passage. The preform is thus preformed with the hole at an angle in relation to the bearing surface. The further forming process thus results in a change of the hole rim from an angular disposition to a substantial offset parallel relationship to the bearing surface.

According to another advantageous feature of the present invention, the preform may be produced only partially so that a respective collar of the through-passage does not extend entirely circumferentially but extends only partially over the circumference. Of course, it is also conceivable, to subject the hole rim or collar at least in part to a further heat treatment after undergoing press hardening.

According to another aspect of the present invention, a body structure for a motor vehicle, with the body structure being hot formed and press hardened and made of hardenable steel sheet, includes at least one opening and is produced by a method as described above.

Such a motor vehicle body structure can be produced more cost-efficiently compared to a motor vehicle structure produced in a conventional manner, and has a longer service life, in particular in the area of the through-passage.

A motor vehicle body structure according to the present invention can be used to produce a B pillar. Of course, other pillars, such as A pillar, C pillar or D pillar, may be produced as well. Other examples include side rails, suspension arms, transmission tunnels, floor panels but also roof skins, roof posts or sills.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
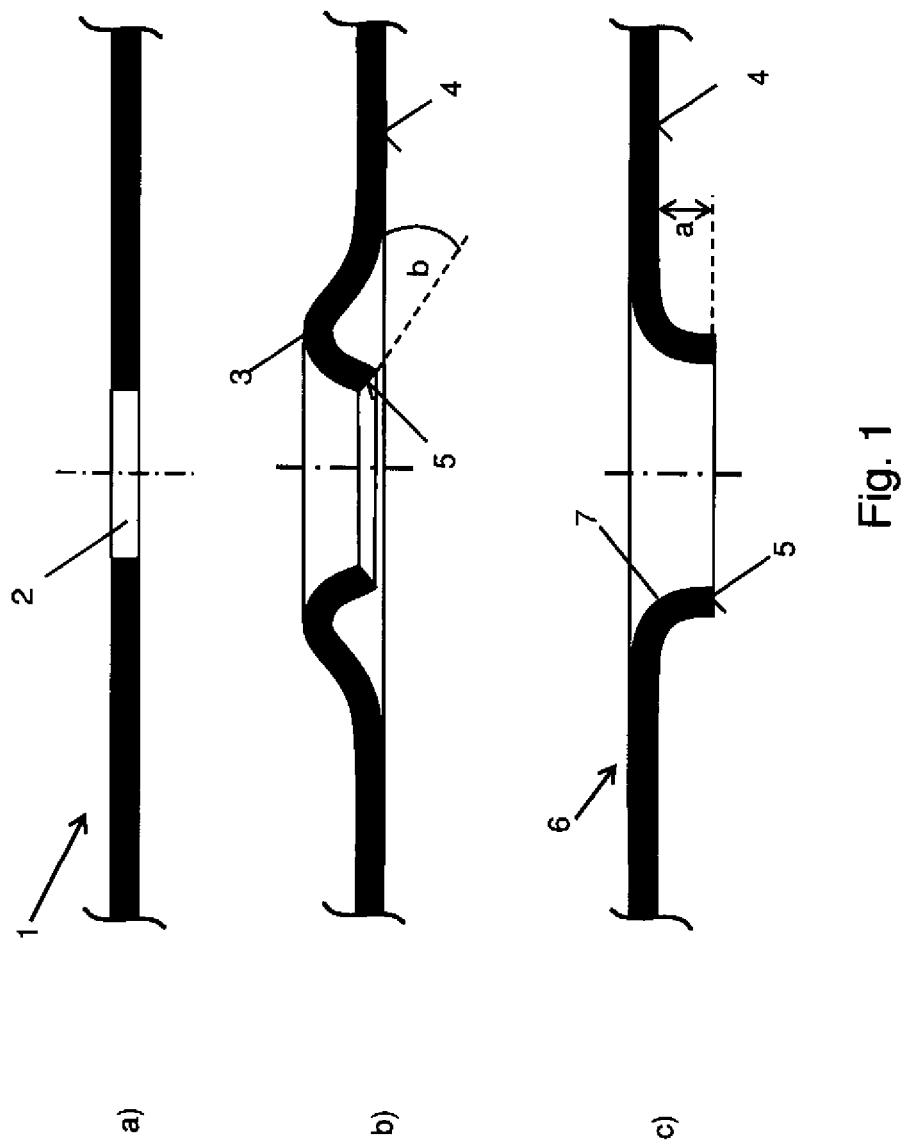
FIGS. 1a-1c are schematic illustrations of different stages for producing a motor vehicle body structure from a sheet metal plate by a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1a-1c, there are shown schematic illustrations of different stages for producing a motor vehicle body structure from a sheet metal plate 1 by a method according to the present invention. The sheet metal plate 1 is made of hardenable steel sheet and has at least one region which is blanked and/or cut out so as to provide a respective hole 2. This hole 2 is preformed in a forming step as an inwardly turned collar 3, as shown in FIG. 1b. The collar 3 is hereby turned inwardly in such a manner that it does not project beyond a bearing surface 4 which may be an underside of the sheet metal plate 1. The collar 3 defines a hole rim 5 which extends at an angle β in relation to the bearing surface 4 of the sheet metal plate 1. In a next step, as shown in FIG. 1c, the motor vehicle body structure 6 is produced and has a through passage 7. The inwardly turned collar 3, as sown in FIG. 1b, is hereby shaped into the through-passage 7 which is spaced at a distance a in relation to the bearing surface 4 and extends substantially parallel thereto.

Figure 2:
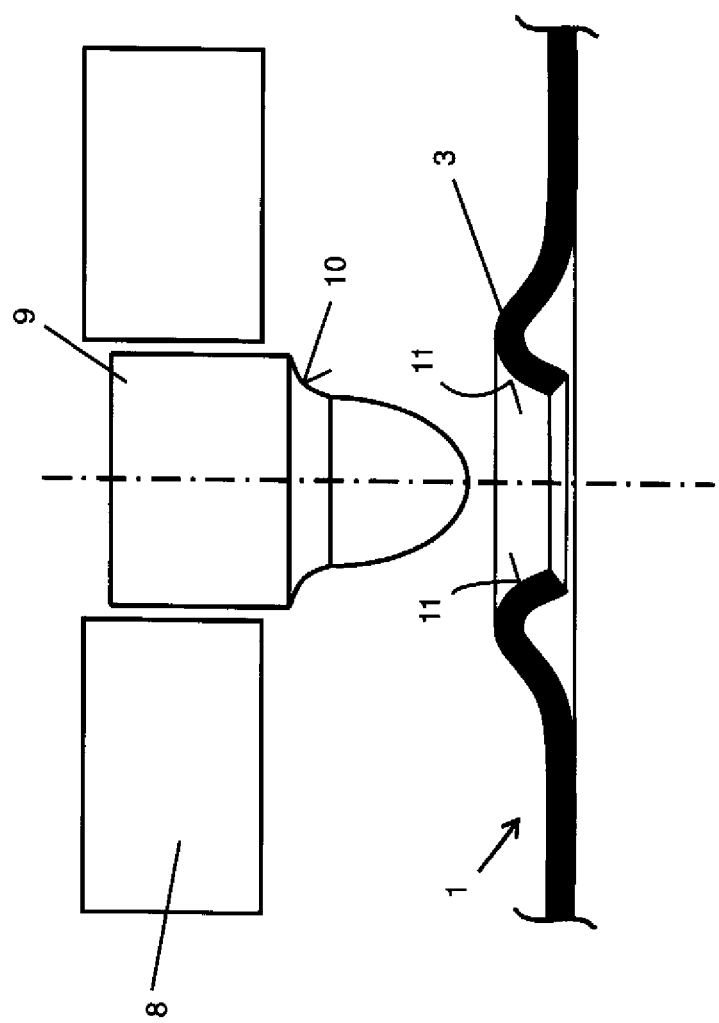
FIG. 2 is a schematic illustration of a preform during hot forming in a top tool.

FIG. 2 shows the sheet metal plate 1 with the inwardly turned collar 3 as produced in accordance with the present invention. The sheet metal plate 1 is hereby placed in a hot forming tool 8 in which a movable mandrel 9 is arranged. The mandrel 9 is introduced into the inwardly turned collar 3 to further shape it in a way as shown in FIG. 1c for example. Subsequently or simultaneously, the hot forming tool 8 is lowered to shape the remaining parts of the sheet metal plate 1 (not shown here) into the motor vehicle body structure 6. The mandrel 9 has a geometry 10 that complements a contour of the inwardly turned collar 3. As the mandrel 9 is lowered, the collar necks 11 bear upon the mandrel 9 and are shaped into the through-passage 7, as shown in FIG. 1c. Crack formation is substantially avoided in this way and the sheet metal plate 1 is precisely positioned in the hot forming tool 8.

Figure 3:
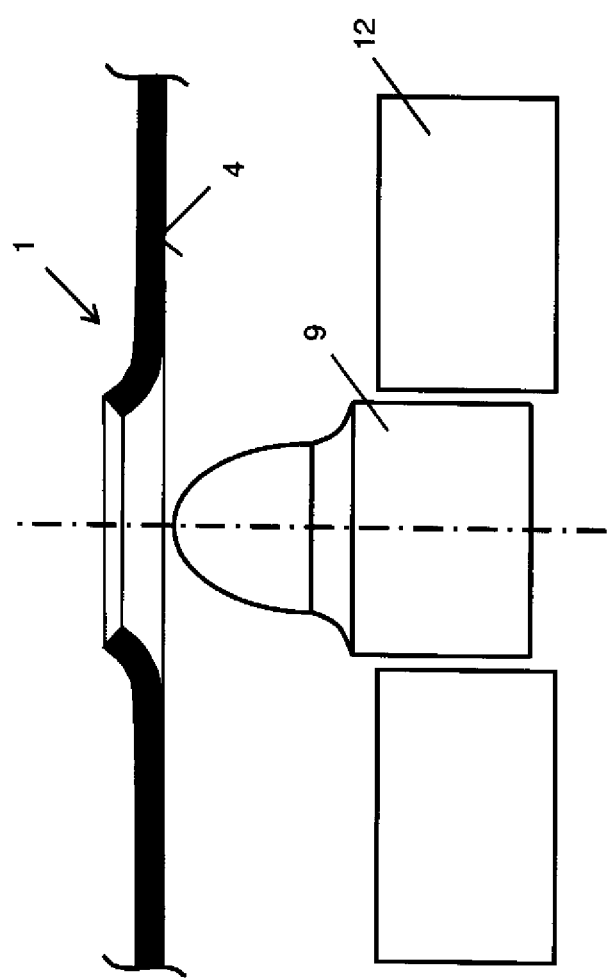
FIG. 3 is a schematic illustration of a preform during hot forming in a bottom tool.

FIG. 3 shows an analogous variation to FIG. 2, with the difference residing in the positioning of the mandrel 9 in a bottom tool 12 of the hot forming tool 8. The mandrel 9 is again movably received in the hot forming tool 8 and can be introduced into the sheet metal plate 1 from the bearing surface 4. In this embodiment, a collar is formed which is not inwardly turned but rather is upwardly preformed and is further shaped by the movable mandrel 9.

Figure 4:
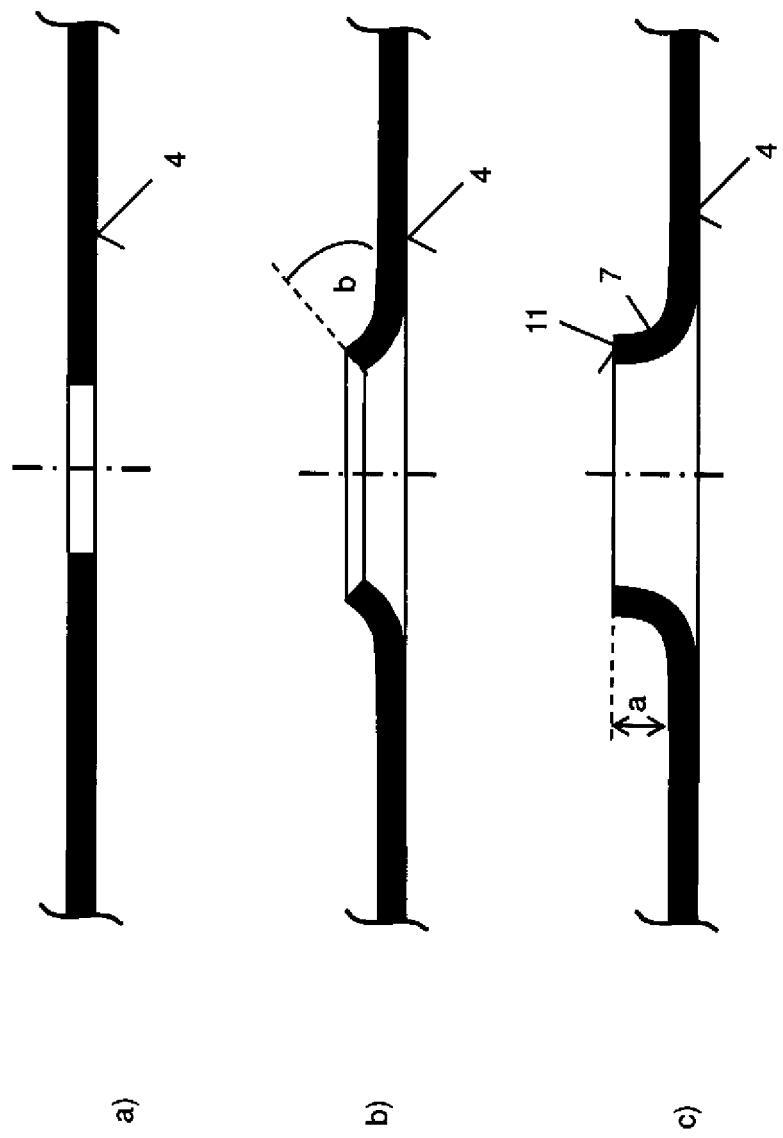
FIGS. 4a-4c are schematic illustrations of different stages for producing a motor vehicle body structure from a sheet metal plate by a method according to the present invention, using a tool according to FIG. 3.

FIGS. 4a-4c show schematic illustrations of different stages for producing a motor vehicle body structure from sheet metal plate 1, using the forming tool 8 according to FIG. 3. The through-passage 7 is hereby formed from the bearing surface 4, i.e. from a bottom side. The hole rim 5 is also configured at a distance a to the motor vehicle body structure 6 and extends substantially parallel thereto. This is made possible because the region of the preform is also preformed at an angle β by which the hole rim 5 extends in relation to the adjacent region of the sheet metal plate 1.

Figure 5:
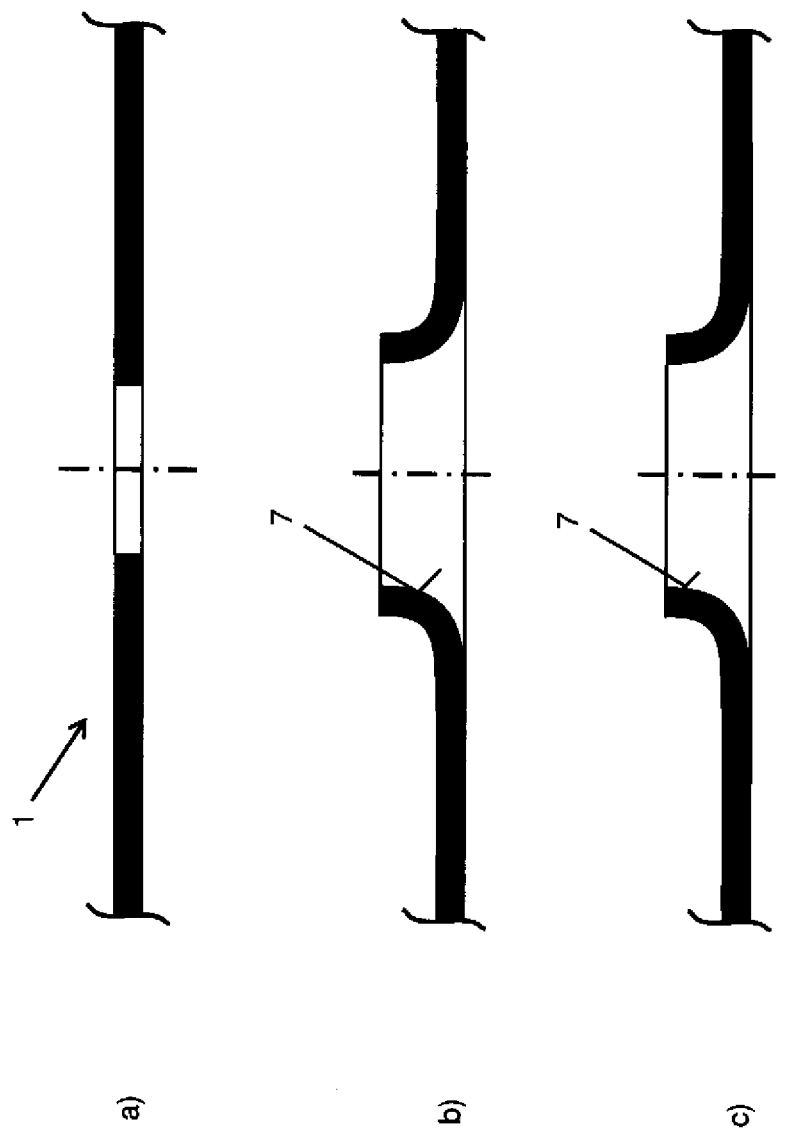
FIGS. 5a-5c are schematic illustrations of different stages for producing a motor vehicle body structure from a sheet metal plate by a method according to the present invention, using a modified tool.

FIGS. 5a-5c show an alternative embodiment in which the sheet metal plate 1 is produced in a preforming stage, as shown in FIG. 5b, already with a contour corresponding to a final shape. The through-passage 7 is thus realized already during the preforming stage close to its final shape and provides a calibration or centering function in the hot forming tool 8, as shown in FIG. 5c. The through-passage 7 does not undergo any substantial change in shape.

Figure 6:
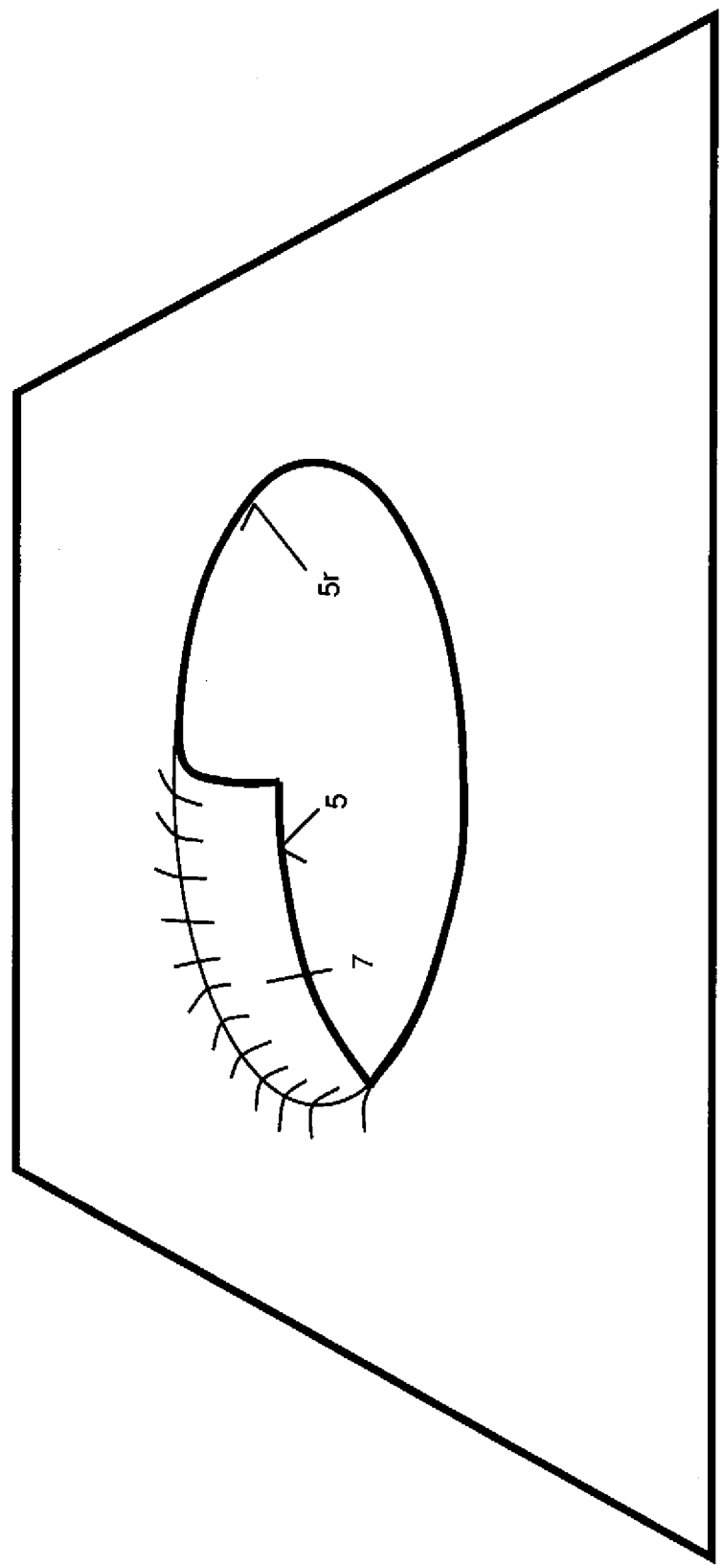
FIG. 6 is a schematic illustration of a through-passage produced in accordance with a method according to the present invention and configured to extend only in part radially circumferentially.

FIG. 6 shows a further variation of the present invention. In this embodiment a through-passage 7 is formed which has a hole rim 5r that extends radially circumferentially only in part. In relation to the drawing plane, only the left side of the through-passage is bent downwards, whereas the right side with the illustrated hole rim 5r is formed without collar neck 11.

Figure 7:
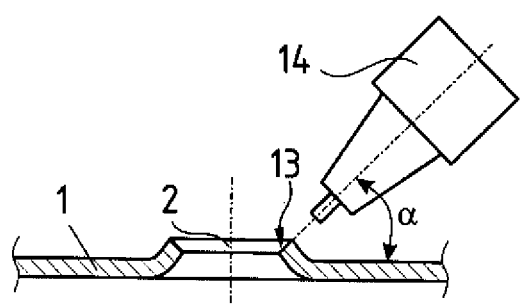
FIG. 7 is a sectional view of a sheet metal plate undergoing a cutting operation.

FIG. 7 is a sectional view of sheet metal plate 1 undergoing a cutting operation, using a cutting tool 14 to cut the marginal region 13 of the hole 2 at an angle α.

Figure 8:
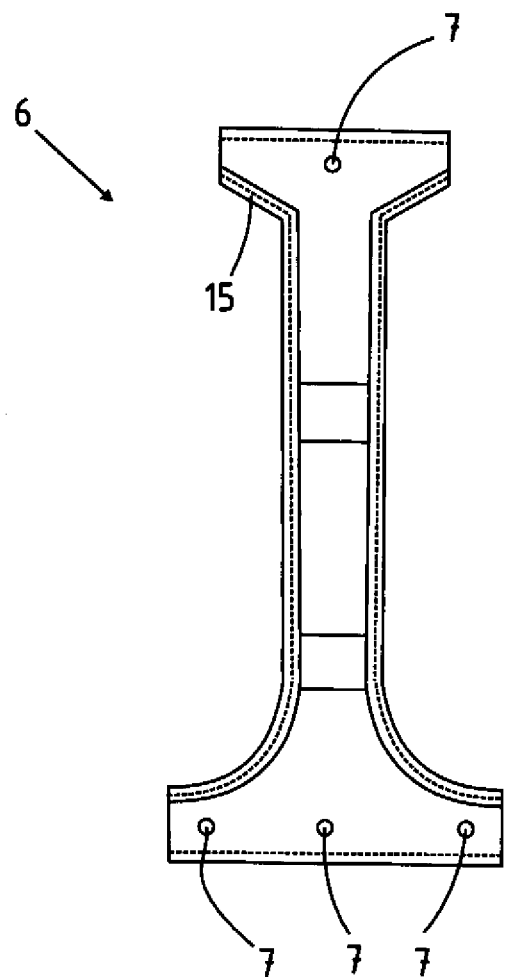
FIG. 8 is a schematic illustration of a motor vehicle pillar produced by a method according to the present invention.

FIG. 8 shows a schematic illustration of a motor vehicle body structure 6 in the form of a motor vehicle pillar having an outwardly extending flange 15. The motor vehicle body structure 6 is produced by a method according to the present invention and thus includes respective through-passages 7.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method of making a motor vehicle body structure, comprising in the following order:
    perforating at least one region of a sheet metal plate of hardenable steel sheet by a blanking and/or cutting process;
    preforming the at least one region of the sheet metal plate into a preform, wherein the preform is configured as a inwardly directed collar to project beyond only one side of the sheet metal plate so that an opposite side thereof is planar; and
    hot forming the preform in a hot forming tool.

2. The method of claim 1, wherein the motor vehicle body structure is a motor vehicle pillar.

3. The method of claim 1 , wherein the collar is inwardly turned.

4. The method of claim 1, wherein the preform is shaped in the absence of an area projecting beyond a bearing surface of the sheet metal plate, and further comprising placing the sheet metal plate with the bearing surface upon a transport system for transfer to a further process step.

5. The method of claim 3, wherein the inwardly turned collar defines a hole rim which extends at an angle in relation to a bearing surface of the sheet metal plate and is shaped by the hot forming step so as to extend in offset parallel relationship to the bearing surface at a distance thereto.

6. The method of claim 1, wherein the preform has a configuration which corresponds to the final shape so that the hot forming step results in a calibration of the preform to receive a precise end contour.

7. The method of claim 1, wherein the preform receives a final shape in the hot forming step.

8. The method of claim 1, wherein the blanking and/or cutting process results in the formation of a hole defined by a hole rim which does not require a finishing process after undergoing the hot forming step.

9. The method of claim 8, wherein the hole rim extends at an angle in relation to a bearing surface of the sheet metal plate and is shaped by the hot forming step so as to extend in offset parallel relationship to the bearing surface at a distance thereto.

10. The method of claim 8, further comprising press hardening the preform in the hot forming tool, and heat treating the hole rim at least in one region thereof after undergoing press hardening.

11. The method of claim 8, wherein the hole is used as cable feedthrough.

12. The method of claim 1, wherein the cutting process is implemented by beam cutting.

13. The method of claim 1, wherein the beam cutting involves a process selected from the group consisting of laser beam cutting, water jet cutting, plasma beam cutting, and electron beam cutting.

14. The method of claim 1, wherein the cutting process is executed at an angle to provide the sheet metal plate with a cutting edge which extends at said angle.

15. The method of claim 14, wherein the angle ranges between 1 and 80 degrees.

16. The method of claim 14, wherein the angle ranges between 10 and 40 degrees.

17. The method of claim 1, further comprising shaping the preform before the hot forming step.

18. The method of claim 17, wherein the shaping step includes introducing into the preform a mandrel which is movable in relation to the hot forming tool.

19. A method of making a motor vehicle body structure, comprising in the following order:
    perforating at least one region of a sheet metal plate of hardenable steel sheet by a blanking and/or cutting process;
    preforming the at least one region of the sheet metal plate into a preform, wherein the preform is configured as collar having a convex portion that faces toward one side of the sheet metal plate and projects beyond only the one side of the sheet metal plate so that an opposite side thereof is planar; and hot forming the preform in a hot forming tool.

20. The method of claim 11, wherein the angle ranges between 10 and 60 degrees.

* * * * *